US012575503B2

(12) United States Patent
Jung et al.

(10) Patent No.: US 12,575,503 B2
(45) Date of Patent: Mar. 17, 2026

(54) THRESHING CONCAVE FOR COMBINE HARVESTER

(71) Applicant: DEERE & COMPANY, Moline, IL (US)

(72) Inventors: Daniel Jung, Saarbruecken (DE); Jonas Zollondz, Saarland (DE); Marco Broschart, Herschberg (DE); Michael Lettau, St. Ingbert (DE)

(73) Assignee: Deere & Company, Moline, IL (US)

( * ) Notice: Subject to any disclaimer, the term of this patent is extended or adjusted under 35 U.S.C. 154(b) by 754 days.

(21) Appl. No.: 18/049,376

(22) Filed: Oct. 25, 2022

(65) Prior Publication Data

US 2023/0157212 A1     May 25, 2023

(30) Foreign Application Priority Data

Nov. 2, 2021     (DE) .......................... 102021128494.5

(51) Int. Cl.
A01F 12/28          (2006.01)
A01F 12/26          (2006.01)

(52) U.S. Cl.
CPC .............. A01F 12/28 (2013.01); A01F 12/26 (2013.01)

(58) Field of Classification Search
CPC .......... A01F 12/28; A01F 12/26; A01F 12/24; A01D 41/12
See application file for complete search history.

(56) References Cited

U.S. PATENT DOCUMENTS

| | | | | |
|---|---|---|---|---|
| 509,490 A | * | 11/1893 | Richter | A01F 12/28 460/109 |
| 953,845 A | * | 4/1910 | Knaak | A01F 12/28 460/109 |
| 962,192 A | * | 6/1910 | Blixt | A01F 12/28 460/109 |
| 1,034,469 A | * | 8/1912 | Larson | A01F 12/28 460/109 |
| 1,191,853 A | * | 7/1916 | Thompson | A01F 12/44 460/84 |

(Continued)

FOREIGN PATENT DOCUMENTS

| | | |
|---|---|---|
| DE | 1130640 B | 5/1962 |
| DE | 1130641 B | 5/1962 |

(Continued)

OTHER PUBLICATIONS

Extended European Search Report and Written Opinion issued in European Patent Application No. 22200164.6, dated Jun. 12, 2023, in 07 pages.

*Primary Examiner* — Arpad Fabian-Kovacs
(74) *Attorney, Agent, or Firm* — Taft Stettinius & Hollister LLP; Stephen F. Rost

(57)          ABSTRACT

A threshing concave for a combine harvester comprises a crop processing device which is arranged at the inlet to the threshing concave and can be adjusted between an active and an inactive position, adjustable elements which are arranged downstream of the inlet to the threshing concave and can be adjusted between an active and an inactive position, and an adjustment mechanism for separate adjustment of the crop processing device and the adjustable elements, which comprises a movable adjustment element which is coupled to the crop processing device and to the adjustable elements.

13 Claims, 5 Drawing Sheets

(56)                 References Cited

U.S. PATENT DOCUMENTS

| | | | | |
|---|---|---|---|---|
| 1,334,910 | A | | 3/1920 | Kuntz |
| 1,449,645 | A | * | 3/1923 | Anderson ............... A01F 12/28 |
| | | | | 460/109 |
| 2,457,259 | A | | 12/1948 | Moll |
| 4,244,380 | A | * | 1/1981 | DePauw ................. A01F 7/067 |
| | | | | 460/108 |
| 4,258,726 | A | * | 3/1981 | Glaser ..................... A01F 12/24 |
| | | | | 460/109 |
| 4,711,075 | A | | 12/1987 | Strong |
| 4,802,496 | A | * | 2/1989 | Bennett ................... A01F 12/28 |
| | | | | 460/109 |
| 4,875,891 | A | | 10/1989 | Turner et al. |
| 6,802,771 | B2 | * | 10/2004 | Schwersmann ....... A01F 12/442 |
| | | | | 460/109 |
| 9,763,390 | B2 | | 9/2017 | Matway et al. |
| 9,854,741 | B2 | * | 1/2018 | Kemmerer ............. A01F 7/062 |
| 10,058,035 | B2 | * | 8/2018 | Kemmerer .............. A01F 7/067 |
| 10,123,484 | B2 | * | 11/2018 | Kemmerer .............. A01F 7/062 |
| 10,314,232 | B2 | | 6/2019 | Isaac et al. |
| 11,191,215 | B1 | * | 12/2021 | Robertson .......... A01D 41/1276 |
| 2011/0320087 | A1 | * | 12/2011 | Farley ..................... A01F 7/067 |
| | | | | 701/34.2 |
| 2013/0137492 | A1 | * | 5/2013 | Biggerstaff ............. A01F 12/28 |
| | | | | 460/62 |
| 2017/0290263 | A1 | | 10/2017 | Kemmner |
| 2017/0339832 | A1 | * | 11/2017 | Matousek ............... A01F 12/28 |
| 2019/0254233 | A1 | | 8/2019 | Kemmerer |
| 2020/0404850 | A1 | | 12/2020 | Brammeier et al. |

FOREIGN PATENT DOCUMENTS

| | | | | |
|---|---|---|---|---|
| DE | 1989612 U | | 7/1968 | |
| DE | 102009047287 A1 | | 6/2011 | |
| DE | 102010061863 A1 | * | 5/2012 | ............ A01F 12/24 |
| DE | 102014224780 A1 | | 6/2016 | |
| DE | 102015205992 A1 | | 10/2016 | |
| DE | 102009047287 B4 | * | 7/2024 | ............ A01F 12/24 |
| EP | 1474964 A1 | * | 11/2004 | ............ A01F 12/28 |
| EP | 2036425 A1 | | 3/2009 | |
| FR | 637181 A | | 4/1928 | |
| FR | 2621216 A1 | | 4/1989 | |
| WO | WO-2014191804 A1 | * | 12/2014 | ............ A01F 12/28 |
| WO | WO-2021222229 A1 | * | 11/2021 | ............ A01F 12/28 |

* cited by examiner

THRESHING CONCAVE FOR COMBINE HARVESTER

CROSS-REFERENCE TO RELATED APPLICATIONS

This claims priority to DE Application No. 102021128494.5, titled Threshing Concave For A Combine Harvester, filed Nov. 2, 2021, which is hereby incorporated by reference in its entirety.

TECHNICAL FIELD

The present disclosure relates generally to a threshing concave for a combine harvester.

BACKGROUND

Agricultural combine harvesters are large machines which harvest, thresh, separate and clean the agriculturally cultivated, grain-bearing crop. The resulting clean grain is stored in a grain tank arranged on the combine harvester. Usually, tangential threshing devices are used for threshing, which have a threshing concave and a threshing drum conveying the crop tangentially, or axial threshing devices conveying the crop axially with axial threshing rotors, which also cooperate with a threshing concave. The threshing concaves are composed of arcuate and transverse bars which leave gaps between them. The threshing concave surrounds the threshing drum over part of its circumference and with it encloses a gap through which the crop to be threshed is forced. While the crop is conveyed through the gap, the crop components (grain) separate out, fall through the gaps and are supplied to a cleaning device. Depending on the crop composition, the components can be separated out to varying levels, so it is useful to be able to adapt the threshing concaves to the respective crop.

Thus, for example, it may be useful to provide at the inlet to the threshing concave, as an additional threshing means, a crop processing device which can be moved, usually rotated, between an active and an inactive position in order to thresh the crop more or less aggressively at the inlet to the threshing concave. Reference is made for example to DE 1 130 641 A, DE 1 130 640 A, U.S. Pat. No. 1,334,910A, EP 2 036 425 A1 and DE 10 2014 224 780 A1.

Furthermore, various adjustable elements are proposed which are arranged downstream of the inlet to the threshing concave, such as finger rakes which can be moved between an active position, running approximately tangentially to the threshing drum, and an outwardly pivoted position (U.S. Pat. No. 2,457,259 A, FR 637 181 A, U.S. Pat. No. 4,875,891 A, FR 2 621 216 A1, DE 10 2009 047 287 A1), or de-awning plates which can be brought into a closed position between adjacent threshing bars so that the crop cannot pass between the threshing bars and hence is cleared of awns by the longer action of the threshing drum (DE 1 989 612 U). Usually, a mechanism is provided via which all elements can be moved jointly, either by hand or by means of an externally powered actuator which can be operated from the cab of the combine harvester by an operator or by an automatic system. The crop processing device at the inlet to the threshing drum is adjusted similarly, usually by hand or via an actuator.

For threshing concaves provided with both a deactivatable crop processing device arranged at the inlet, and also adjustable elements (arranged downstream of the inlet to the threshing concave), two actuation elements are required in the form of manually operable levers or similar, or in the form of actuators in the case of automatic or remote control, which entails a relatively great complexity.

SUMMARY

The disclosure concerns a threshing concave for a combine harvester, having a crop processing device which is arranged on the threshing concave and can be adjusted between an active and an inactive position, adjustable elements which are arranged downstream of the inlet to the threshing concave and can be adjusted between an active and an inactive position, and an adjustment mechanism for separate adjustment of the crop processing device and the adjustable elements.

The object on which the disclosure is based is to provide a threshing concave of the type cited initially for a combine harvester in which said problems do not arise or only arise to a reduced extent.

A threshing concave for a combine harvester is provided with a crop processing device which is arranged on the threshing concave and can be adjusted between an active and an inactive position, adjustable elements which are arranged downstream of the inlet to the threshing concave and can be adjusted between an active and an inactive position, and an adjustment mechanism for separate adjustment of the crop processing device and the adjustable elements. The adjustment mechanism comprises a movable adjustment element which is coupled to the crop processing device and to the adjustable elements.

In this way, by manual or actuator-induced adjustment only of the adjustment element, either by hand or via an actuator, both the crop processing device and also the adjustable elements can each be moved independently of one another between an active and an inactive position. Therefore, only a single actuating element is required.

It should be pointed out that the crop processing device and/or the adjustable element can be moved by the movable element of the adjustment mechanism not only between an active position and an inactive position, but in one possible embodiment can also be moved into one or more or any number of intermediate positions between the active and inactive position. Thus, the degree of effect of the adjustable element and/or the crop processing device may be varied in more than one step or steplessly, in each case independently of one another. Furthermore, the movable element of the adjustment mechanism could also move any arbitrary third, fourth etc. adjustable device of the threshing concave.

In particular, the adjustment element may be coupled to the crop processing device and the adjustable elements such that in a first position of the adjustment element, the crop processing device and the adjustable elements are in the active position, in a second position of the adjustment element, the adjustable elements are in the inactive position and the crop processing device is in the active position (or vice versa), and in a third position of the adjustment element, the crop processing device and the adjustable elements are in the inactive position.

The crop processing device may be a rotatable body arranged at the inlet to the threshing concave, with threshing elements in the form of protrusions arranged thereon. The adjustable elements could be de-awning plates or finger bars.

The adjustment element may be a rotatable disk provided with two curves which are each coupled via cams and coupling elements to the adjustable elements and the crop processing device.

The threshing concave may cooperate with a tangentially conveying threshing drum or an axially conveying axial threshing rotor.

BRIEF DESCRIPTION OF THE DRAWINGS

An exemplary embodiment of the disclosure is explained with reference to the drawings. The drawings show.

DETAILED DESCRIPTION

Figure 1:
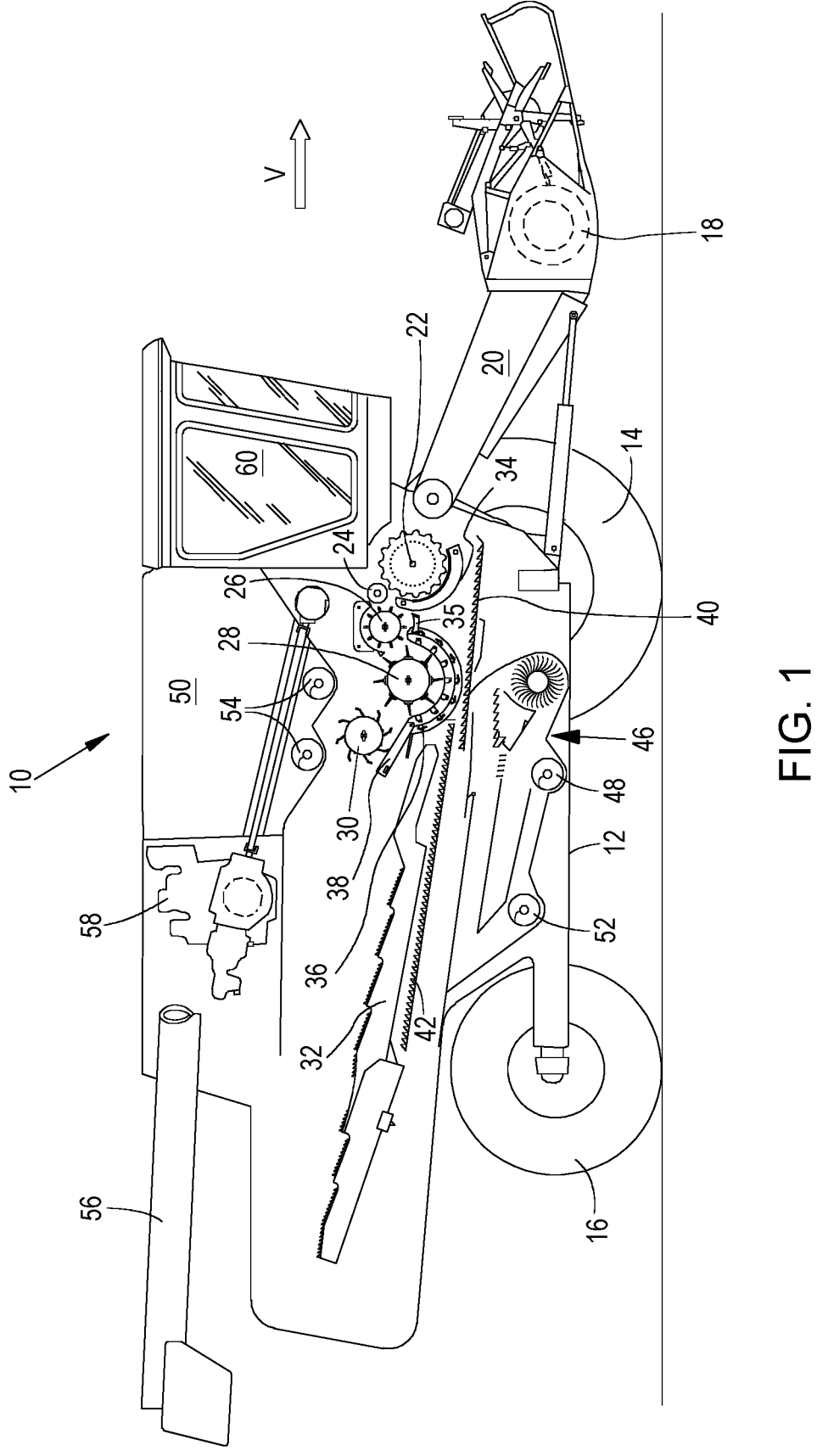
FIG. 1, a partially cut-away, side view of a combine harvester with a threshing concave, FIG. 2, a perspective view of the front region of the threshing concave from FIG. 1 from below, FIG. 3, a view similar to FIG. 2 with adjustment element in a first position, FIG. 4, a view similar to FIG. 2 with adjustment element in a second position, and FIG. 5, a view similar to FIG. 2 with adjustment element in a third position.
Figure 2:
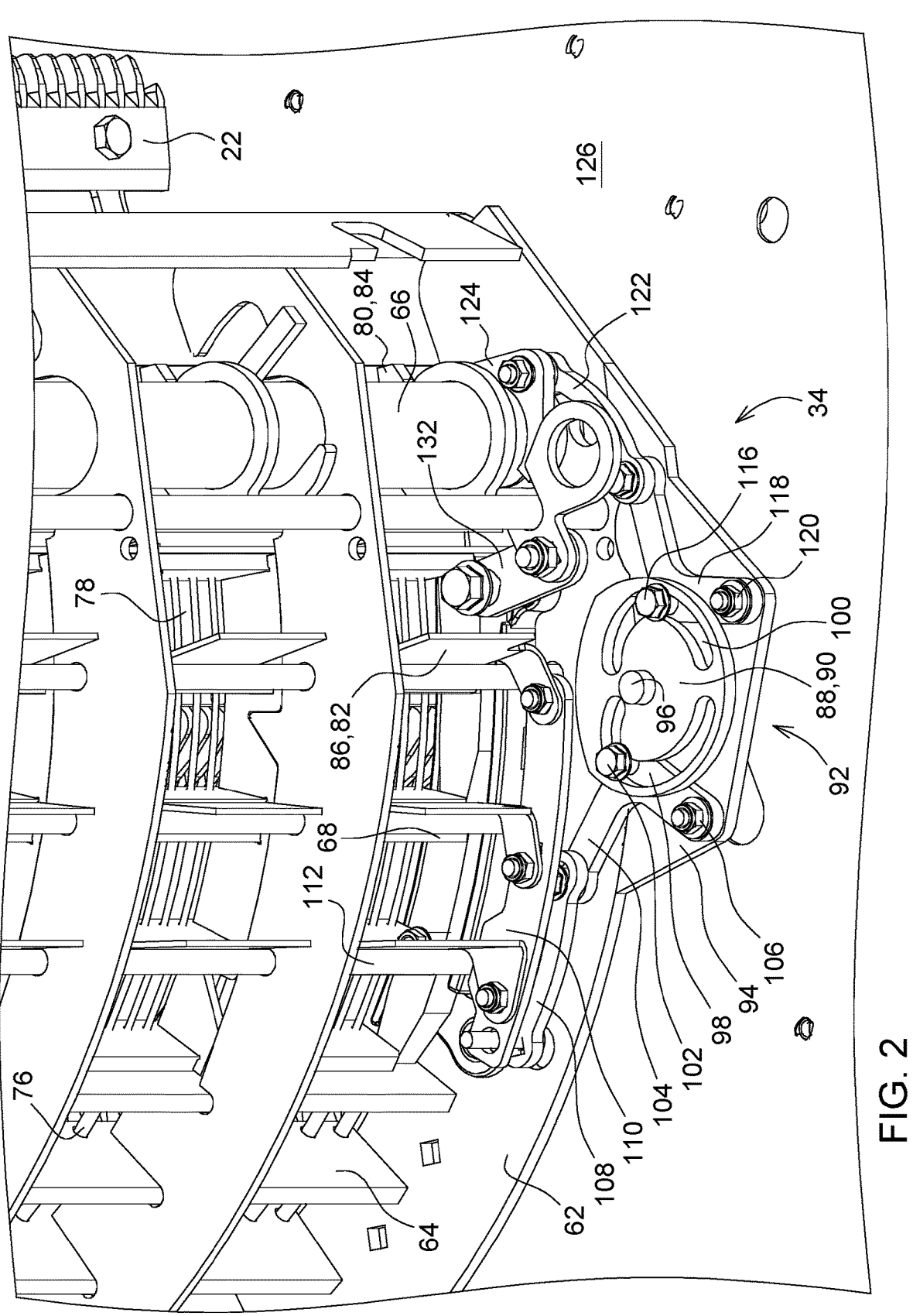

FIG. 1 shows a self-propelled combine harvester 10 with a frame 12 which rests on the ground via driven front and steerable rear wheels 14, 16 and is advanced thereby. The wheels 14 are set in rotation by drive means (not shown) in order to move the combine harvester 10 for example over a field to be harvested.

A crop processing device 18 in the form of a cutting unit is removably mounted in the front end region of the combine harvester 10, in order during harvesting to harvest the crop in the form of cereals or other threshable grains from the field, and deliver it upward and rearward via a feeder house 20 to a multi-drum threshing gear which comprises a threshing drum 22, a stripping drum 24, an overshoot conveying drum 26, a separating drum 28 and a discharge conveyor 30, which are arranged one behind the other in the direction of travel V. Downstream of the discharge conveyor 30 is a straw walker 32. The threshing drum 22 is surrounded by a threshing concave 34 in its lower and rear regions. A cover 35, which is either closed or provided with openings, is arranged below the conveying drum 26, while a fixed cover is provided above the conveying drum 26, and a separating cage 36 with adjustable finger elements is arranged below the separating drum 28. A separating grating 38 is arranged below the undershoot discharge conveyor 30.

A front conveyor floor 40 is provided below the multi-drum threshing gear. A rear conveyor floor 42 is arranged below the straw walker 32. The conveyor floors 40, 42 transport the mixture of grain, short straw and chaff from the threshing concave 34, the separating cage 46, the separating grating 38 and the straw walker 32, to a cleaning device 46. The grain cleaned by the cleaning device 46 is supplied by means of a grain auger 48 to an elevator (not shown) which conveys it to a grain tank 50. A returns auger 52 returns unthreshed ears via a further elevator (not shown) to the threshing process. The chaff may be ejected at the rear of the sieve device by a rotating chaff distributor or is discharged via a straw chopper (not shown) arranged downstream of the straw walker 32. The cleaned cereal from the grain tank 50 may be discharged via a discharge system with transverse augers 54 and an output conveyor 56.

Said systems are driven by means of an internal combustion engine 58 and are controlled and operated by an operator from a driver's cab 60. The various devices for threshing, conveying, cleaning and separating are situated inside the frame 12. Outside the frame 12 is an outer shell which can be largely opened. In another embodiment, the threshing gear may also comprise only the threshing drum 22, the stripping drum 24 and the discharge conveyor 30, i.e., be designed as a conventional tangential threshing system without separating drum 28 and without conveying drum 26, in which the discharge conveyor 30 directly follows the threshing drum 22. All directional indications below, such as front, back, above and below, relate to the forward travel direction V of the combine harvester 10.

Reference is now made to FIGS. 2-5. The threshing concave 34 itself is of conventional design and comprises two arcuate side cheeks 62 adapted to the radius of the threshing drum 22, between which threshing bars 68 extend (in the front region of the threshing concave 34). Following the threshing bars 68 in the circumferential direction of the threshing drum 22 (i.e., in a rear region), the threshing concave 34 comprises further arcuate bars 64, between which cage wires 76 are arranged which extend in the circumferential direction. Further cage wires 78 are also arranged between the threshing bars 68. These are thinner than the cage wires 76 arranged in the rear region of the threshing concave 34, but present in a greater number.

A crop processing device 84 is arranged in front of the threshing concave 34 in the flow direction of the crop. The crop processing device 84 comprises a body 66 extending between the side cheeks 62, where it is mounted so as to be rotatable about its longitudinal axis. On the body 66, threshing elements 80 are arranged which can be moved, by rotation of the body 66 about its longitudinal axis, between an active position (see FIGS. 2, 3 and 4) in which they are in engagement with the crop and provide a certain threshing effect, and an inactive position (FIG. 5) in which they are spaced from the crop. In particular, the crop processing device 84 may be configured in accordance with EP 2 036 425 A1 or DE 10 2014 224 780 A1, the disclosure of which is included by reference in the present documents.

Furthermore, in the front region of the threshing concave 34 in which the threshing bars 68 are present (said region being formed as an insert which is removable by means of a suitable mechanism 132, cf. DE 10 2015 205 992 A1, the disclosure of which is included by reference in the present documents), adjustable elements 86 are provided which, in the exemplary embodiment illustrated, are configured as so-called de-awning plates 82. The adjustable elements 86 (as evident in FIGS. 3-5) are movable between an open position (shown in f FIGS. 2, 4 and 5) and a closed position (shown in FIG. 3). In the closed position, the de-awning plates 82 serve to prevent the passage of crop components (in particular grain) between the threshing bars 68, so that the crop is processed more intensively in the front region of the threshing concave than when the de-awning plates 82 are opened and can only drop down between the cage wires 74 at the earliest in the rear region of the threshing concave 34. The de-awning plates 82 are known in themselves (see DE 1 989 612 U) and in another embodiment could be replaced by adjustable finger bars as adjustable elements.

Accordingly, the threshing concave 34 comprises an adjustable crop processing device 84 and the adjustable elements 86, which can be adjusted independently of one another between an active and an inactive position. As discussed above, the crop processing device 84 and the adjustable elements 86 have separate actuating means in the form of manually operated levers or actuators for adjustment. The present disclosure deals with an adjustment mechanism 92 which allows movement of both the crop processing device 84 and the adjustable elements 86 between an active and an inactive position, independently of one another, by means of a single adjustment element 88.

5

Figure 3:
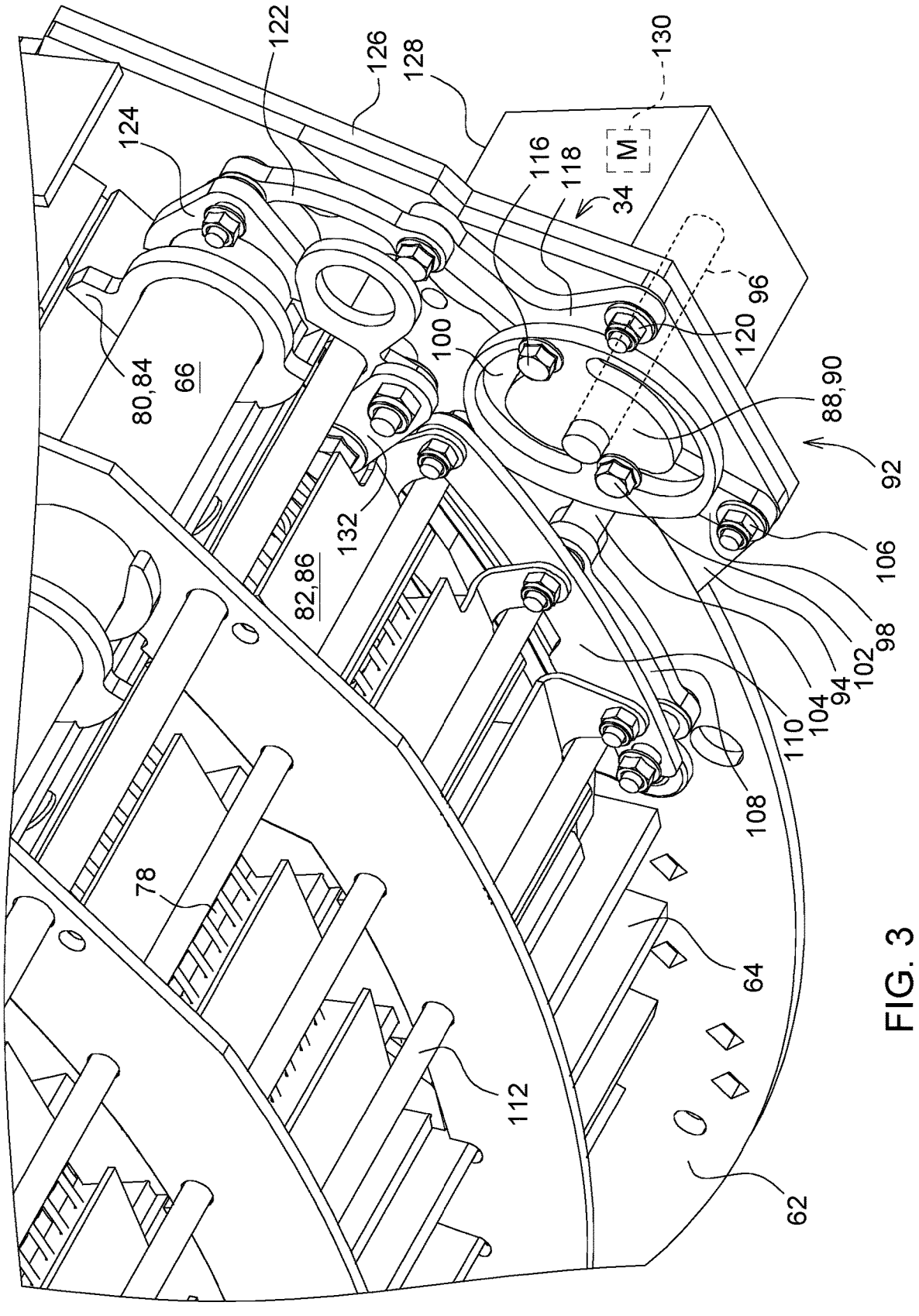
Figure 4:
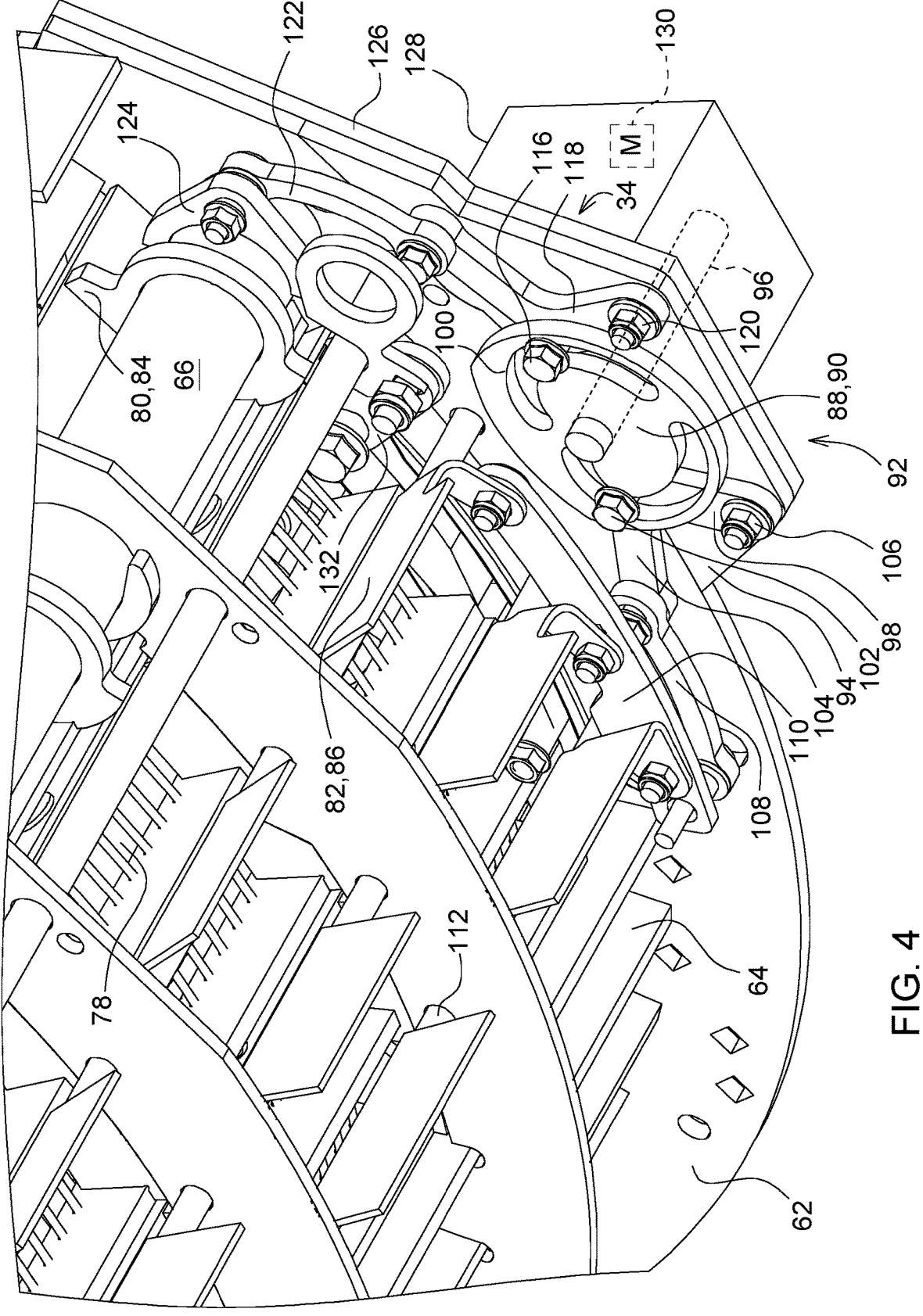

The adjustment element 88, configured as a cam disc 90, is rotationally fixedly connected to a shaft 96 which extends orthogonally to the plane of the side cheeks 62, is arranged centrally on the cam disc 90 and is mounted rotatably on a downwardly extended portion 94 of one of the side cheeks 62. The shaft 96 and hence the adjustment element 88 can themselves be rotated about their longitudinal and rotational axis via said actuating means between two end positions, one of which is shown in FIG. 3 and one in FIG. 5, while FIG. 4 shows an intermediate position.

The cam disc 90 comprises two curved tracks 98, 100 configured as curved slots.

A first control cam 102, which engages in and hence cooperates with the first curved track 98, is attached to a first lever 104 which rests via a first bearing 106 on the lower region of the portion 94. The angled first lever 104 is rotatably connected at its second end to a first push-rod 108 which in turn is rotatably coupled at its rear end to a forwardly extending first bracket 110. The front ends of the adjustable elements 86 (de-awning plates 82) are rotatably hinge-mounted at the first bracket 110 and supported by their rear ends on transverse rods 112. When the cam disc 90 is turned by the shaft 96, accordingly the first lever 104 rotates about the first bearing 106 and moves the first push-rod 108 forward or backward, the movement of which is transferred to the first bracket 110 which moves the front ends of the adjustable elements 86 forward and upward or backward and downward, while the rear ends of the adjustable elements 86 rotate about the transverse rods 112. Thus, the first curved track 98, via the first control cam 102, the first push-rod 108 and the first bracket 110, moves the adjustable elements 86 between an active and an inactive position. The first curved track 98 is dimensioned such that the adjustable elements 86 are in the active (closed) position in the left end position of the adjustment element 88 (see FIG. 3), while they are in the inactive (open) position in the middle position (FIG. 4) and in the right end position. It is pointed out that the adjustable elements 86 could be also arranged in the middle region of the threshing concave 34 or are coupled to the threshing concave 34 via suitable coupling elements. For this, the adjustable elements 86 are connected rotationally fixedly to the respective transverse rods 112, which in turn are mounted on the threshing concave 34 so as to be rotatable about their longitudinal axes.

A second control cam 116, engaging in the second curved track 100, is connected to a second lever 118, which is rotatably supported via a second bearing 120 on the lower end of the portion 94. The angled second lever 118 is rotatably connected at its other end to a second push-rod 122, which in turn is coupled via a rotary bearing to a second bracket 124 attached to the body 66 of the crop processing device 84. When the cam disc 90 is turned by the shaft 96, accordingly the second lever 118 rotates about the second bearing 120 and moves the second push-rod 122 upward or downward, the movement of which is transmitted to the second bracket 124 which turns the body 66. Thus, the curved track 100, via the second control cam 116, the second push-rod 118 and the second bracket 124, moves the crop processing device 84 between an active and an inactive position. The curved track 100 is dimensioned such that the threshing elements 80 of the crop processing device 84 are in the active position in the left end position of the adjustment element 88 (see FIG. 3) and in the middle position (FIG. 4), while they are in the inactive position in the right end position.

As shown in FIG. 3, the shaft 96 is connected to a (single) actuating element 128 outside a side wall 126 of the frame

6

Figure 5:
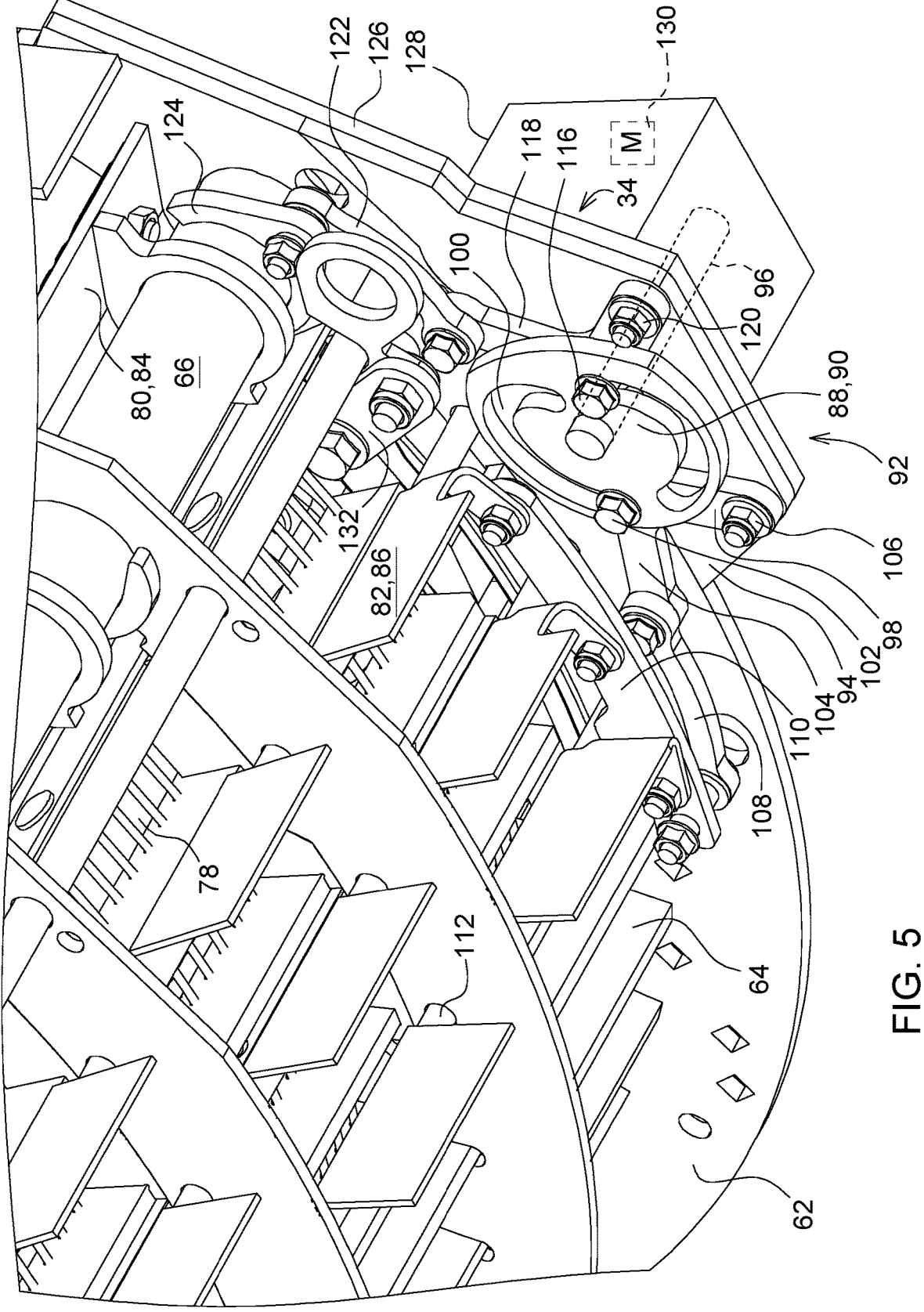

12 against which the side cheek 62 lies, said element comprising an actuator 130 which may be configured as an electric or hydraulic motor and allows rotation of the shaft 96 between the three rotary positions described (see FIGS. 3-5). The shaft 96 thus extends through an opening in the side wall 126. The actuator 130 may be actuated by means of an operator interface arranged in the driver's cab 60, or by means of an automatic system which can operate the actuator 130 automatically according to properties of the crop detected by sensor(s). In another embodiment, the actuating element 128 is designed as a lever via which the shaft 96 can be turned manually between the described positions. In any case, the adjustment mechanism 92 according to the disclosure avoids the need for a second opening in the side wall 126 which would be required for passage of a second shaft for separate actuation of the adjustable elements 86 and the crop processing device 84. The manual or actuator-controlled adjustment takes place outside the side wall 126, which improves accessibility and accelerates any necessary manual adjustment. Also, the actuator 130 may be arranged outside the crop flow.

If the threshing concave 34 is arranged with adjustable spacing relative to the threshing drum 22 (see DE 10 2014 209 219 A1), the opening in the side wall 126 through which the shaft 96 extends may be configured as an oblong hole or slot, and the actuating element 128 may also be adjusted via a corresponding coupling to the threshing concave 34.

The adjustment mechanism 92 described provides a first position of the adjustment element 88 (left end position shown in FIG. 3) in which the crop processing device 84 and the adjustable elements 86 are in the active position, a second position of the adjustment element 88 (middle position shown in FIG. 4) in which the adjustable elements 86 are in the inactive position and the crop processing device 84 is in the active position, and a third position of the adjustment element 88 (right end position shown in FIG. 5) in which the crop processing device 84 and the adjustable elements 86 are in the inactive position. These three positions have proved suitable in practice since an active position of the adjustable elements 86 with an inactive crop processing device 84 is not required in practice. If this should nevertheless be the case, a modified form of the curved tracks 98, 100 could also allow this fourth position.

What is claimed is:

1. A threshing concave for a combine harvester, comprising:

a crop processing device which is arranged on the threshing concave with threshing elements adjustable between an active position to thresh crop and an inactive position, adjustable elements which are arranged downstream of an inlet to the threshing concave and can be adjusted between an active position and an inactive position to control passage of crop, and an adjustment mechanism for separate adjustment of the crop processing device and the adjustable elements, wherein the adjustment mechanism comprises a moveable adjustment element which is coupled to the crop processing device and to the adjustable elements, and when the moveable adjustment element is moved to a first position, the threshing elements of the crop processing device are disposed in the active position and the adjustable elements are disposed in the active position; when the moveable adjustment element is moved to a second position, the threshing elements of the crop processing device are disposed in the active position and the adjustable elements are disposed in the inactive position; and the moveable adjustment element is moved to a third position, the threshing elements of the crop processing device are disposed in the inactive position and the adjustable elements are disposed in the inactive position.

2. The threshing concave as claimed in claim 1, wherein the moveable adjustment element can be adjusted manually or via an actuator.

3. The threshing concave as claimed in claim 1, wherein the crop processing device is a rotatable body arranged at the inlet to the threshing concave and with the threshing elements arranged thereon.

4. The threshing concave as claimed in claim 2, wherein the crop processing device is a rotatable body arranged at the inlet to the threshing concave and with the threshing elements arranged thereon.

5. The threshing concave as claimed in claim 1, wherein the adjustable elements are de-awning plates, the active position of the de-awning plates includes a closed position configured to prevent passage of crop.

6. The threshing concave as claimed in claim 3, wherein the adjustable elements are de-awning plates, the active position of the de-awning plates includes a closed position configured to prevent passage of crop.

7. The threshing concave as claimed in claim 1, wherein the moveable adjustment element is a rotatable disk provided with two curves which are each coupled via cams and coupling elements to the adjustable elements and the crop processing device.

8. The threshing concave as claimed in claim 3, wherein the moveable adjustment element is a rotatable disk provided with two curves which are each coupled via cams and coupling elements to the adjustable elements and the crop processing device.

9. The threshing concave as claimed in claim 5, wherein the moveable adjustment element is a rotatable disk provided with two curves which are each coupled via cams and coupling elements to the adjustable elements and the crop processing device.

10. A combine harvester with a threshing concave as claimed in claim 1, which cooperates with a tangentially conveying threshing drum or an axially conveying axial threshing rotor.

11. A combine harvester with a threshing concave as claimed in claim 3, which cooperates with a tangentially conveying threshing drum or an axially conveying axial threshing rotor.

12. The threshing concave as claimed in claim 7, wherein the two curves include a first curved track and a second curved track, the cams include (i) a first cam movably engaging the first curved track and coupled to the adjustable elements and (ii) a second cam movably engaging the second curved track and coupled to the crop processing device.

13. The threshing concave as claimed in claim 12, wherein when the rotatable disk of the moveable adjustment element is moved to between the first position, the second position, and the second position, the first cam and the second cam move concurrently in the first curved track and the second curved track to control the threshing elements and adjustable elements.

* * * * *